United States Patent [19]

Kruder

[11] 4,173,417
[45] Nov. 6, 1979

[54] EXTRUSION APPARATUS AND METHOD
[75] Inventor: George A. Kruder, Marion, Ohio
[73] Assignee: HPM Corporation, Mount Gilead, Ohio
[21] Appl. No.: 917,204
[22] Filed: Jun. 20, 1978

Related U.S. Application Data

[63] Continuation-in-part of Ser. No. 788,028, Apr. 15, 1977, abandoned.

[51] Int. Cl.² .............................................. B29B 1/06
[52] U.S. Cl. ..................................... 366/89; 366/323; 425/208
[58] Field of Search ....................... 366/89, 88, 90, 83, 366/84, 79, 81, 323, 319; 425/207, 208

[56] References Cited

U.S. PATENT DOCUMENTS

| Re. 28,901 | 7/1976 | Kim | 366/88 |
| 3,570,654 | 3/1971 | Hill | 366/343 |
| 3,593,843 | 7/1971 | Hill | 366/89 |
| 3,687,423 | 8/1972 | Koch | 366/89 |
| 3,701,512 | 10/1972 | Schippers | 366/89 |
| 3,737,151 | 6/1973 | Schaeffer | 366/89 |
| 3,858,856 | 1/1975 | Hsu | 366/88 |
| 3,866,890 | 2/1975 | Tadmor | 366/76 |
| 3,867,079 | 2/1975 | Kim | 425/208 |
| 3,870,284 | 3/1975 | Kruder | 366/82 |
| 3,881,708 | 5/1975 | Carle | 366/89 |
| 4,015,832 | 4/1977 | Kruder | 366/89 |

FOREIGN PATENT DOCUMENTS

| 1266136 | 3/1972 | United Kingdom | 366/79 |
| 1266142 | 3/1972 | United Kingdom | 366/79 |

*Primary Examiner*—Robert W. Jenkins
*Attorney, Agent, or Firm*—Albert L. Jeffers; John F. Hoffman

[57] ABSTRACT

In accordance with the present invention an extruder screw having a helical conveying land is provided with a helical barrier land therewithin to form a pair of parallel helical flow channels. Each flow channel includes repeating wave cycles. Each wave cycle is of varying depth, having alternating wave crests and valleys. The wave cycles of the adjacent channels are helically offset so that a wave crest of one channel lies opposite a valley in the adjacent channel. The barrier land is undercut in a manner which facilitates the flow of melt thereacross from one channel to the other, while restricting the flow thereacross of unmelted solids. Solids thus tend to pass through a restriction formed by the wave crest while the melt travels across the barrier flight into the adjacent channel, thereby minimizing the formation of pressure pulses in the extrudate flow. The clearance above the barrier flight is small, and the width of the barrier flight is very narrow so as to impart little energy input i.e., heat, to the melt. Melting of the solids passing over the wave crest is maximized by dimensioning the wave crest restriction small enough to assure intensive working of the solids. The clearance between the wave crest and the wall of the surrounding barrel is in the range of from about 0.05 to about 0.10 times the square root of the diameter of the barrel wall. The clearance between a valley and the barrel wall is about 2.5 to about 5 times the clearance between a wave crest and the barrel wall.

20 Claims, 6 Drawing Figures

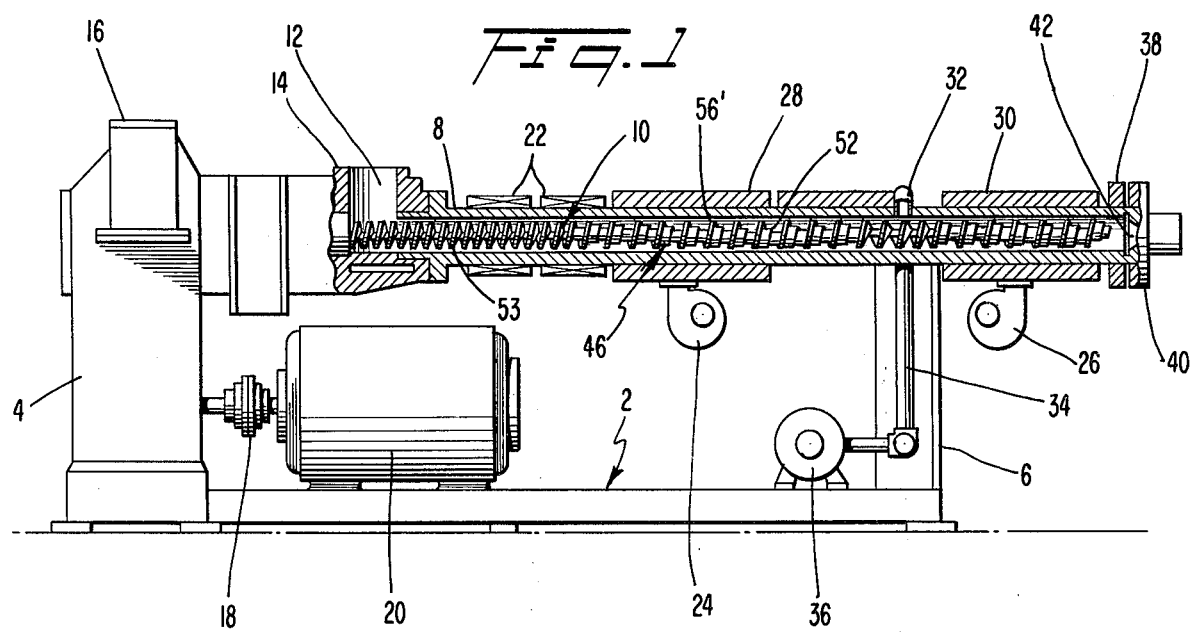

EXTRUSION APPARATUS AND METHOD

RELATED INVENTIONS

This is a continuation-in-part of my earlier application Ser. No. 788,028, filed Apr. 15, 1977 and now abandoned, the latter being an improvement on the invention described in my U.S. Pat. Nos. 3,870,284, and 4,015,832 issued Mar. 11, 1975 and Apr. 5, 1977, respectively.

BACKGROUND AND OBJECTS

This invention relates to extruders of the type in which a screw rotatable within a barrel is employed to extrude material to a die or injection mold connected to the outlet end of the barrel. The invention is concerned particularly with improvements in high output plasticating extruders.

A plasticating extruder receives polymer pellets or powder (often together with formulation additives in liquid or particle form), works and raises the temperature of the polymer sufficiently to dispose it in a melted or plastic state, and delivers the melted polymer under pressure through a restricted outlet or die. Ordinarily it is desirable that the discharge extrudate be fully melted, well mixed, uniform in temperature and pressure, and substantially free of small gels and other fine structure agglomerations. It also is desirable that the rate of delivery of the molten polymer through the die be regulatable simply by changing the rate of extruder screw rotation and that the rate of delivery at the selected screw speed be substantially uniform.

The basic extruder apparatus includes an elongated barrel which may be heated or cooled at various locations along its length and a screw which extends longitudinally through the barrel. The screw has a helical conveying land on its surface which cooperates with the cylindrical internal surface of the barrel to define an elongated helical channel.

An extruder screw ordinarily has a plurality of sections which are of configurations specifically suited to the attainment of particular functions. Examples are "feed" sections and "metering" sections, which are of basic importance and are present in nearly all plasticating extruders for handling thermoplastic polymers.

A typical extruder screw feed section extends beneath and forwardly from a feed opening where polymer in pellet or powder form is introduced into the extruder to be carried forward along the inside of the barrel by the feed section of the screw.

As the material is advanced along the channel, it is worked. This, in turn, generates heat, and melting of the polymer proceeds as the material is moved along the feed section and later sections of the screw. Actually, most of the melting occurs near the barrel surface at the interface between a thin melt film and the solid bed of polymer. This general pattern persists until a substantial portion of the polymer reaches the melted state. It is usually advantageous to employ a tapered transition section between the relatively deep feed section and the shallower metering section. Prior to solid bed breakup this keeps the solid bed width larger and more tightly pressed against the barrel wall, thereby enhancing the melting rate. After some 40% to 70% of the polymer has been melted, solid bed breakup usually occurs, and at this time particles of solid polymer become dispersed in the polymer melt.

An extruder screw "metering" section has as its special function the exertion of a pumping action on the molten polymer. Ordinarily, the throughput achieved by a screw is thought of as being a function of the combination of the "drag flow" and "pressure flow" effects of the metering section.

Drag flow is basically the flow which results from the relative movement between the screw and the internal surface of the extruder barrel. It may be thought of as being proportional to the product of the average relative velocity and the channel cross-sectional area. Stated in another way, the drag flow is the volumetric pumping capacity, the latter being a function only of screw channel dimensions times screw rpm. This drag flow component is directed toward the outlet end of the screw. It may be increased by increasing the speed of the screw and/or by increasing the depth of the flow channel in the screw.

Acting in opposition to drag flow is a pressure flow component stemming from the reluctance of the material to flow through the restricted outlet opening at the end of the extruder passage. The speed of the screw does not directly affect the pressure flow component but of course it may affect such factors as back pressure and material viscosity, which factors, in turn, affect significantly the pressure flow component. On the other hand, pressure flow is directly effected by both the depth and length of the screw channel; and increase in channel depth has a tendency to increase greatly the pressure flow component and an increase in channel length has a tendency to reduce this back flow component.

In the above-referenced patents of the present inventor there is described an extruder screw whose metering section includes one or more channels following a wave-like cylical pattern wherein each channel includes periodic wave peaks. The wave portion of the screw performs both metering and mixing functions. Insofar as metering or pumping is concerned, the systematically repeating wave pattern functions like conventional long metering sections of constant depth in the sense of providing uniform output approximately proportioned to screw rotational speed and providing normal resistance to pressure flow in a rearward direction along the screw channel.

In addition to its good metering properties, the wave portion of the screw has the advantage of achieving good mixing of the polymer without generating excessive heat. In the regions of the wave crests, the material is subject to high shear forces so that incompletely melted polymer will be worked and mixed vigorously with the molten material. The material passes from each zone of high shearing action into an adjacent zone of increased channel depth where the heat generating effects are much less intense.

This wave screw design has performed effectively to produce high quality melt. Notwithstanding this successful performance, efforts are continuously directed toward increasing the rate of extrudate production. In this regard it should be noted that in single channel extruders the maximum height of the wave crests is limited, and the wave crests may not begin to occur ahead of a location along the screw where considerable melting has already taken place. Otherwise, the presence of solid at the wave crests can create a serious restriction to extrudate flow.

It has been heretofore proposed in U.S. Pat. No. 3,701,512 issued Oct. 31, 1972 to Schippers et al in an effort to intensify melting and mixing of extrudate, to divide a single screw channel into a pair of side-by-side helical channels by an intermediate shearing thread. The channel depths would vary continuously and oppositely along the length of the passages (i.e., mirror images of one another) so that the combined passage cross-sectional area is maintained constant along the screw length. As one channel becomes diminished in depth, the adjacent channel depth becomes correspondingly enlarged, so that extrudate is expelled from the diminishing channel, across the shearing thread, and into the enlarging channel. Proposals such as this do not effectively deal with problems such as overheating and non-uniform temperatures of extrudate at the screw outlet, however. Moreover, these proposals do not optimize melting within a channel by solids enrichment and shear working at the wave peaks.

It is, therefore, an object of the present invention to provide methods and apparatus which minimize or obviate problems of the above-described sort.

It is another object of the present invention to provide novel extruding methods and apparatus which maximize production rate while maintaining acceptable temperature and pressure parameters at the screw tip.

It is yet another object of the present invention to provide a novel extruding screw structure and methods which maximize the rate of extrudate production within an acceptable range of maximum temperature and temperature fluctuations.

It is a further object of the invention to provide novel extruding methods and apparatus which minimize the occurrence pressure pulses during extrudate feeding.

It is still another object of the invention to provide novel extruding methods and apparatus which maximize mixing and circulation of melted and unmelted materials.

BRIEF SUMMARY

In accordance with the present invention an extruder screw having a helical conveying land is provided with a helical barrier land therewithin to form a pair of parallel helical flow channels. Each flow channel includes repeating wave cycles. Each wave cycle is of varying depth, having alternating wave crests and valleys. The wave cycles of the adjacent channels are helically offset so that a wave crest of one channel lies opposite a valley in the adjacent channel. The barrier land is undercut in a manner which facilitates the flow of melt thereacross from one channel to the other, while restricting the flow thereacross of unmelted solids. Solids thus tend to pass through a restriction formed by the wave crest while the melt travels across the barrier flight into the adjacent channel, thereby minimizing the formation of pressure pulses in the extrudate flow. The width of the barrier flight is smaller than that of the conveying flight and is less than eight percent (most preferably one to four percent) of the screw pitch. The barrier flight is thus very narrow and imparts little energy input i.e., heat, to the melt. The clearance above the barrier flight is dimensioned to minimize energy input to the melt, while restricting the passage of unmelted material thereacross. Melting of the solids passing over the wave crest is maximized by dimensioning the wave crest restriction small enough to assure intensive working of the solids. The clearance between the wave crest and the wall of the surrounding barrel is in the range of from about 0.05 to about 0.10 times the square root of the diameter of the barrel wall. The clearance between a valley and the barrel wall is about 2.5 to about 5 times the clearance between a wave crest and the barrel wall.

The channel waves can be configured so that the combined cross-sectional area of both channels is non-uniform throughout a portion of each cycle. In addition, the cycle portions of decreasing depth can be helically longer than the portions of increasing depth, within a given channel. As a consequence, recirculation of melt and solids is intensified.

THE DRAWING

These and other objects and advantages of the present invention will become apparent from the following detailed description of preferred embodiments thereof, wherein like numerals designate like elements and in which:

FIG. 1 is a side elevational view of an extruding machine, with a portion of the barrel broken away to expose a screw according to the present invention;

FIG. 2 is a fragmentary, side elevational view of one preferred form of one channel wave according to the present invention;

DETAILED DESCRIPTION OF THE PREFERRED EMBODIMENTS

Figure 3:
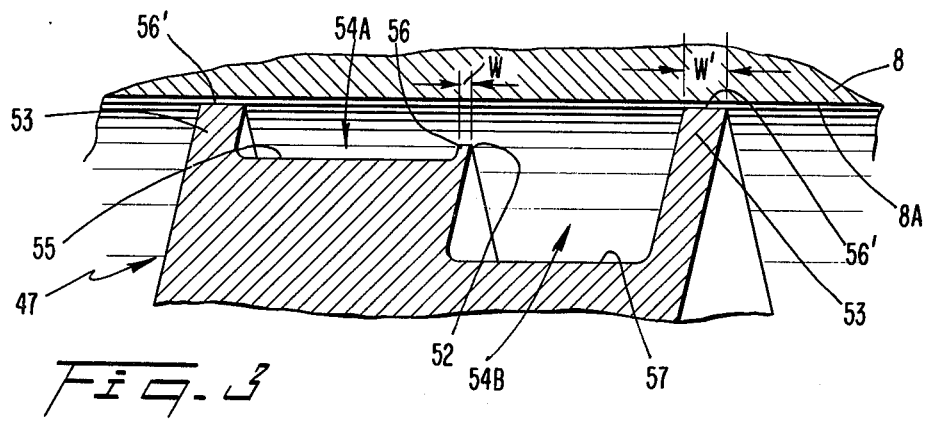
FIG. 3 is a fragmentary, longitudinal sectional view through an extruder screw according to the present invention.

Although the present invention is concerned particularly with the configuration of extruder screws, it will be helpful initially to consider generally the overall organization of a typical plasticating extruder machine. The machine shown in FIG. 1 includes frame means 2 having upwardly extending portions 4 and 6 at its ends for supporting the actual extrusion components. These components include a horizontally extending barrel 8 and a screw 10 rotatably disposed within the barrel 8. At its rear end the barrel 8 communicates with a feed opening 12 extending upwardly through a stationary thrust housing 14. This feed opening 12 ordinarily receives material from a hopper (not shown) overlying the thrust housing 14.

The rear end of the screw 10 is mounted for rotation about an axis coincident with the axis of the cylindrical inner surface of the barrel 8 and is coupled to a speed reducer 16 carried by the left end upright 4 of the frame means. The speed reducer 16 is connected by gear means (not shown) and by a flexible coupling 18 to a motor 20.

Temperature control means 22 are associated with the barrel 8 of the extruder to supply heat to and/or remove heat from the material being processed. Such means are conventional, and as indicated in FIG. 1, they may advantageously be located near the feed end of the barrel to so regulate the barrel temperature as to achieve efficient melting of the polymer being fed through the barrel. Pumps 24 and 26 also may be provided to force fluid through jackets 28 and 30 surrounding downstream portions of the barrel. The flowing fluid in these zones ordinarily is employed to remove heat from the barrel so as to prevent exessive temperatures and also to optimize the shear action upon melt film at the barrel wall.

The barrel may be provided with a transverse opening 32 intermediate to its length. This opening 32 may be plugged in a conventional manner when the extruder is operated with a single stage screw, or it may be coupled by means 34 to a vacuum pump 36 to serve as a vent when the extruder is operated with a two stage screw 10 mounted within the barrel 8 as illustrated in FIG. 1.

A head clamp plate 38 is secured to the outer end of the extruder barrel 8 and provides support for a swing gate 40 or other adaptive support of conventional construction. The swing gate 40 has an internal channel for the extrudate, and in the more usual extrusion operations, dies are fixed to the swing gate to receive the extrudate passing through the opening therein.

A breaker plate 42 is shown in FIG. 1 as being fixed in position at the end of the barrel 8. Such a breaker plate 42 is basically a screen through which the polymer melt must pass in moving to the die. It normally prevents particles of impurities or solid polymer from entering the die.

The portions of the extruder which have been described above with reference to FIG. 1 of the drawings are well known to persons skilled in the art, and it will be recognized that numerous variations are possible. However, such variations are not particularly significant as far as the present invention is concerned, and they need not be referred to in detail here.

The screw 10 shown in FIG. 1 as being positioned within the extruder barrel 8 is a relatively complex two stage screw especially suitable for the extrusion of styrene sheet. However, it will be understood that the present invention is also adaptable to single stage screws which omit the venting feature.

In accordance with the present invention an extruder screw 47 includes a double channel wave screw metering section 46 which may be of the single or double stage. This metering section, as depicted in FIG. 3, includes a helical barrier land 52 disposed in the middle of a flow passage formed by the conveying land 53 of the screw and proceeds in parallel with the conveying land 53, so that the passage is divided into two adjacent channels 54A, 54B. The channels 54A, 54B travel is parallel alongside one another and then combine at the end of the screw. It will be appreciated that each channel is formed by the barrier land 52, the conveying land 53, and a base surface 55, 57. The barrier land 52 is undercut relative to the conveying land 53, i.e. is of smaller radius, for reasons to be discussed.

Each of the channels 54A, 54B has a wave-like pattern. That is, the depth of each channel (i.e., the distance from the outer edge of the conveying flight to the channel base) varies so that wave crests are formed periodically along each channel. Each wave crest constitutes a channel section of restricted depth. Between the wave crests are disposed deeper valley portions. In FIG. 3 a crest portion of 54A and a valley portion of channel 54B are depicted. It will be realized that the wave crests are formed by a base surface portion of maximum radius, and the valleys are formed by a base surface portion of minimum radius. The adjacent channels 54A, 54B are arranged wherein the wave crests are offset helically, so that a wave crest of one channel lies adjacent a valley portion of the other channel. In this fashion, melt can be effectively transferred across the barrier land from the passage containing the wave crest to the channel containing the valley.

The width W of the outer edge 56 of the barrier land 52 is substantially less than the width W' of the outer edge 56' of the conveying land 53. More particularly, the barrier land width is less than eight percent of the conveying screw pitch Pi and most preferably lies within the range of from about one percent to four percent of that pitch. In this fashion, the barrier land is narrow, and little shearing action is imposed upon melt which is transferred across the barrier land, thereby avoiding excessive energy input, and thus heating, of the melt. This contributes significantly to the acceptable temperatures and temperature variances exhibited by the present invention.

The channel waves 54A, 54B may be formed in any suitable manner. For example, the waves may be of continuously varying depth (FIGS. 2, 4), or of the so called "flat bottom" type (FIGS. 5, 6), as will be discussed subsequently in detail.

A "flat bottom" channel 58 (FIGS. 5, 6) forms wave cycles each having a valley portion 60 of constant depth separated by protrusions 62, which include bottom surface portions 64, 66 of increasing and decreasing radius. A wave crest 68 is formed at the tip of each protrusion 62.

Preferably, for flat-bottom waves each protrusion 62 occupies about one-third of its associated cycle, with the valley portion occupying the remaining two-thirds.

Figure 5:
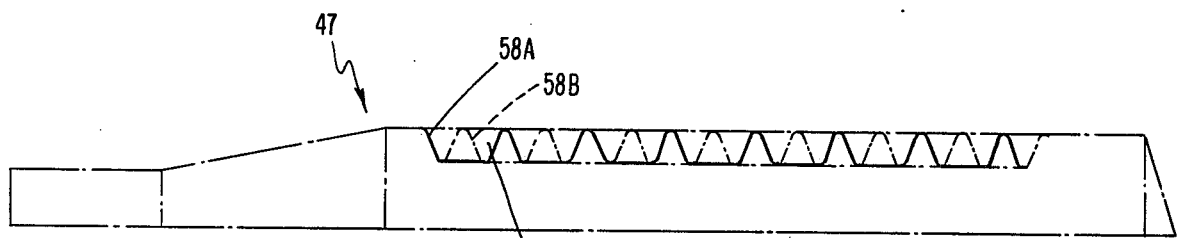
FIG. 5 is a schematic, diagrammatical view of another preferred form of channel wave pattern.

The adjacent flat bottom channels 58A, 58B are arranged so that a wave crest 68 of one channel lies next to a valley portion 60 of the adjacent channel, as depicted schematically in FIG. 5. Immediately preceeding and following each protrusion in a cycle there occurs a short extent 70 of a valley (one-sixth of a cycle) which lies next to a valley portion of the adjacent channel.

Each wave cycle extends for 540 degrees along the channel (one and one-half screw turns), there occurring at least four wave cycles in each channel to minimize pressure fluctuations at the screw tip. Other arrangements, of course, are possible, such as spacing the protrusions of each wave by 360 degrees, with an equal number of wave crests disposed on each side of a given channel for balanced distribution along the screw.

It will be realized that the combined cross-sectional area of the channels 58A, 58B, i.e., the cross-section across the passage formed by the conveying land 53, is not constant throughout an entire wave cycle. Rather, such cross-sectional area varies axially, except in those regions 70 immediately following and preceeding each protrusion.

It has been found that the provision of wave channels whose combined cross-sectional area are nonconstant serves to maximize the complexity of sequential flow pattern changes within and between channels 58A, 58B which augments the melting and mixing actions.

The wave crests are dimensioned so that the channel restriction formed thereby imparts maximum shearing action to solid material. The height of such restriction may approximate the thickness of individual particles P. Oftentimes, channel depth can be even less than particle thickness since many types of heated compressed pellets are easily deformed. The particles approach the wave crest and are worked between the protrusion and the inner barrel surface 8A. The ensuing energy input serves to heat and melt the solid. Melt flow, which ordinarily would be partially blocked as particles pass through the restriction, is able to transfer to the adjacent valley.

In order to achieve optimum heating and melting of the particles, the clearance between the wave crest and barrel surface 8A preferably lies within a range from about 0.05 to about 0.10 times the square root of the barrel inner diameter. This assures that the particles are amply worked in shear to promote heating and melting.

The clearance between a valley portion of each wave cycle (i.e., a base surface portion of minimum radius) and the barrel surface is in the range of from about 2.5 to 5 times the clearance between a wave crest (i.e., a base surface portion of maximum radius) and the barrel surface.

The magnitude of the clearance between the barrier flight 52 and the barrel surface 8A is determined so as to facilitate flow of melt across the barrier land 52 with minimum shear while minimizing the transfer of solid thereacross. It has been found, for example, that in a 2.5 in. diameter screw, a clearance in the range of from about 0.040 to 0.080 in. with a narrow barrier width, easily achieves the object. For larger screw diameters this range changes in direct proportion to the diameter ratio to the 0.7 power, i.e., a range of clearance for a 4.5 in. diameter screw can be found by the formula:

Clearance = $0.040[\text{or } 0.080] \times (4.5/2.5)^{0.7}$

It may be desirable to progressively vary the height of some wave crests within each channel. That is, one or more of the initial wave crests in a channel would have greater clearance than that of the downstream wave crests in the channel. In this connection, it has been found that the quantity of unmelted particles P gradually decreases in a downstream direction as melting progresses. Thus, larger clearance at the earlier protrusions would accommodate larger concentrations of particles occurring there. As the concentrations become diminished with increasing melting action, the downstream clearances can be smaller. Consequently, an unduly large back-up of solid is avoided. Preferably, the protrusions of the channels are oriented so that forces generated by the interaction between flowing extrudate and the protrusions are balanced along the screw.

Figure 4:
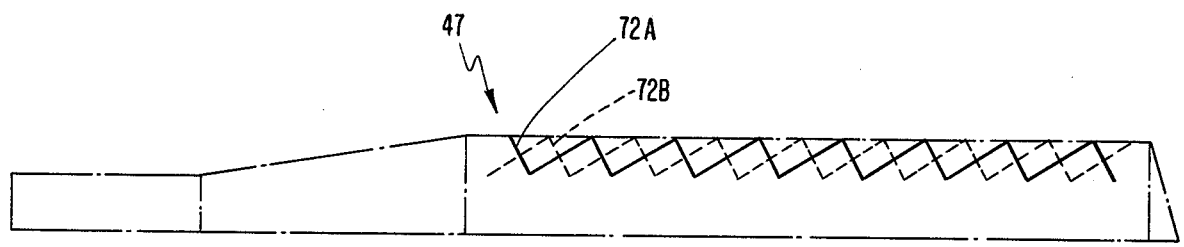
FIG. 4 is a schematic diagrammatical view of the channel wave pattern depicted in FIG. 2.

Wave channels 72A, 72B of continuously varying depth are depicted in FIGS. 2, 4. These channels are each of progressively increasing and decreasing radius, thereby providing a continuously varying channel depth. Each wave in a single stage screw with a long meter section is preferably completed over 540 degrees of the helical channel and there are at least four cycles in each channel. In a two stage screw each wave can be completed over a shorter helical extent. The regions of greatest radial dimension along the base surface of each channel define wave crests 74. The regions of smallest radial dimension form valleys 76. The wave crests of adjacent channels are offset in the helical direction so that each wave crest lies alongside a deeper channel portion of the adjacent channel.

Preferably, in at least some applications, the portion of each wave which is of increasing radius occupies more than one-half of the wave cycle and is thus longer than the portion of decreasing radius, as depicted diagrammatically in FIG. 4. Accordingly, the unmelted particles approach each wave crest relatively gradually, and then descend in a more rapid fashion. This asymmetrical relationship of each wave provides a gradual, extended zone for the melt to transfer to the adjacent channel, and generates an intensive recirculation and intermixing of melt and solid downstream of the wave crest. A similar feature can be incorporated in the protrusions 62 of the flat bottom waves 58A, 58B, if desired.

Figure 6:
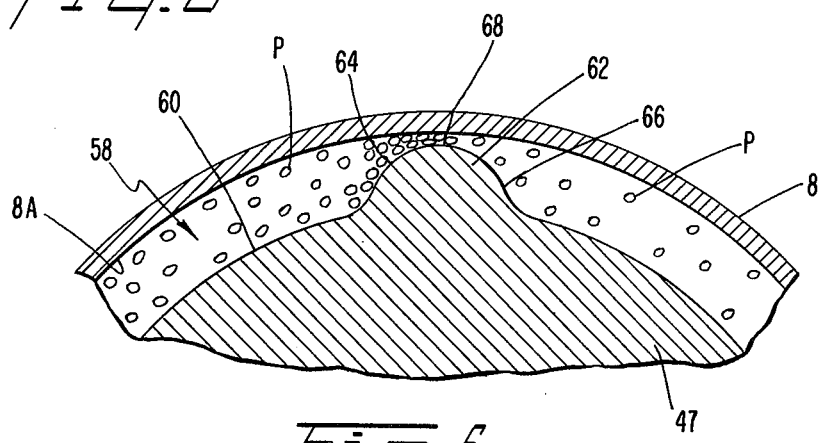
FIG. 6 is a cross-sectional view through a screw and barrel, depicting the channel wave illustrated in FIG. 5.

In other aspects, these wave channels are similar to the flat bottom waves described in connection with FIGS. 5, 6. That is, the combined cross-sectional area of the channels 72A, 72B varies throughout a wave cycle. The wave crests are dimensioned so as to provide restrictions in range from about 0.05 to about 0.10 times the square root of the barrel diameter. The wave crest restrictions can be progressively increased in height in a downstream direction.

It should be noted at this point that the pitch Pi of the conveying screw flight in either of the disclosed embodiments should be such that the axial advance of each flight in each 360 degrees about the screw axis is in the range of from about 1.25 to about 1.50 times the diameter described by the outer surface of the conveying flight.

It should also be noted that in cases where a two stage, vented screw is employed, that portion of the screw disposed opposite the vent, is of non-wave construction, to avoid displacement of extrudate through the vent.

The twin channel screw of the present invention is not limited to use with extruder dies, but may also be used in conjunction with injection molding machines.

OPERATION

Extrudate flow is divided between the channels 54A, 54B (FIG. 3). The melt and solid in one of the channels eventually approaches the first wave crest.

In the absence of an undercut barrier flight, all of the melt and solid would have to pass through the restriction at each wave crest. Consequently, at the first few wave crests the particles squeezing through the restriction tend to exhibit rapidly varying partial blockage of the liquid path. Since there would be no way for the liquid melt to communicate with an alternative flow path, small and rapid hydraulic pressure pulses would probably take place in the first few waves in situations where melting is fairly incomplete. This can result in varying output pressure and speed at the screw tip.

By contrast, in the twin channel wave screw having an undercut barrier flight, the melt approaching the wave crests is in communication with an adjacent deeper channel across the undercut barrier. Since significant amounts of the surrounding melt can thus transfer to this deeper channel region, the formation of pressure pulses is minimized. Moreover, by removing melt from the channel, the particles are able to wedge up into each wave crest restriction more easily. This assures more rapid melting of the particles jammed into the wave crests. In practice, then, the wave crests for twin channel wave screws having an undercut barrier can be made more restrictive than those of single channel wave screws. Results obtained during experimentation show that the twin channel wave screw can produce faster melting and greater flow stability than single channel wave screws. Furthermore, a single design can give outstanding performance with a wide range of polymers.

In accordance with the present invention these advantages are achieved without excessive heating of the melt. The narrow configuration of the barrier flight imparts minimal energy input, and thus minimal heat, to the melt. Therefore, the melt passes across the undercut barrier with minimal heat input and, in so doing avoids travel through the wave crest restriction and the heat input which would accompany such travel. The clearance between the barrier flight and the barrel promotes the transfer of melt while resisting transfer of particles. Accordingly, the temperature, as well as temperature fluctuations of the melt at the screw outlet are maintained within an acceptable range.

The wave crest restrictions are maintained sufficiently shallow to assure that intensive shearing and heating of solid particles occurs.

By maintaining a nonuniform cross-sectional area across the conveying flight throughout a substantial extent of the wave cycle, the mixing action is intensified.

Intensive mixing action also takes place as a result of the arrangement wherein the wave portion of increasing radius is longer than the portion of decreasing radius.

Experimentation has demonstrated the improved behavior of the extruder screw of the present invention. In one test in particular, a 2½ in. dia., 28:1 L/D screw having a twin channel metering section was initially constructed in accordance with the flat bottom design described above in connection with FIGS. 5, 6. The twin channel metering section was dimensioned in length at 18 L/D. The channel depth between protrusions was 0.25 in. and the protrusions, or wave crests, were repeated every 5.25" axial distance (i.e., 1.5 turns) in each channel on a 3.5 in. pitch screw flight. The barrier flight was undercut 0.040 in. The wave crest clearance was about 0.04 in. in depth. The clearance of the conveyor flight was 0.002 in. The outer surface of the barrier flight had a width of 0.25 in. This initial test screw design can be designated as screw 1-A for comparison purposes in Table A.

Following initial testing of screw 1-A, the screw was modified by further increasing the wave crest depth to 0.080 in. This screw version is designated as screw 1B.

Subsequently, the barrier clearance was increased to 0.060 in. (test screw 1C).

Finally, test screw 1D was provided by narrowing the barrier width to 0.0625 in.

Test results utilizing each of these screw designs were obtained for polyethylene, polypropylene, and high impact polystyrene as indicated in Table A on the following page.

From a study of this table, it is apparent that for all three polymers the melt temperature was lowered and the output increased progressively with successive changes in screw design. Yet, the final "1-D" design with the very narrow center barrier with 0.060" undercut never exceeded ±0.5% pressure fluctuation at the breaker plate (still much less entering the extrusion die). At high screw speeds this is much better than obtained in an earlier study with conventional and single channel wave screws. The temperature recordings especially for the 1-D design, fall within an acceptable range and, just as significantly, displayed minimal variations. Note for example, that at 220 rpm of the 1-D screw for high impact polystyrene material the temperature fluctuations occurred within a range of only ±0.8° F. and pressure fluctuations fell within a range of only ±8 psi.

TABLE A

| Screw Type | Screw RPM | Output Lb/Hr | Output Lb/Hr/RPM | Power Required Lb/Hr/HP | Melt Temperature °F. | Pressure At Breaker Plate PSI |
|---|---|---|---|---|---|---|
| POLYETHYLENE 2 M.I.; 0.92 Dens.) Exxon LD-115 | | | | | | |
| Barrel Temperature 350° F. (Except Rear Zone at 300° F.) | | | | | | |
| 1-A | 80 | 116 | 1.45 | 9.7 | 414.5 ± 0 | 1500 ± 0 |
|  | 160 | 268 | 1.68 | 7.4 | 43.4 ± 2 | 1850 ± 2 |
|  | 216 | 378 | 1.75 | 6.9 | 447 ± 6 | 1975 ± 3 |
| 1-B | 80 | 153 | 1.91 | 10.9 | 392 ± .2 | 1700 ± 2 |
|  | 160 | 311 | 1.94 | 8.2 | 409.5 ± .6 | 220 ± 4 |
|  | 212 | 419 | 1.98 | 7.3 | 418 ± .8 | 2400 ± 5 |
| 1-C | 80 | 155 | 1.94 | 10.8 | 391 ± .3 | 1850 ± 4 |
|  | 160 | 328 | 2.05 | 8.7 | 408 ± .6 | 2380 + 5 |
|  | 216 | 438 | 2.0 | 7.6 | 417 ± .9 | 2600 ± 7 |
| 1-D | 80 | 168 | 2.10 | 12.2 | 384 ± .5 | 1925 ± 8 |
|  | 160 | 345 | 2.16 | 9.1 | 389 ± .8 | 2550 ± 12 |
|  | 220 | 460 | 2.09 | 8.0 | 400 ± .8 | 2850 ± 12 |
| POLYPROPYLENE (4 M.I.; 0.904 Dens.) Hercules 6523 | | | | | | |
| Barrel Temperature 450° F. | | | | | | |
| 1-A | 80 | 79 | 0.99 | 10.7 | 481 ± .5 | 750 ± 6 |
|  | 160 | 190 | 1.19 | 9.4 | 508 ± .5 | 975 ± 9 |
|  | 216 | 250 | 1.16 | 8.0 | 514.5 ± 0.7 | 1100 ± 5 |
| 1-B | 80 | 94 | 1.18 | 12.2 | 469 ± .7 | 850 ± 2 |
|  | 160 | 193 | 1.21 | 9.3 | 480 ± .6 | 1100 ± 3 |
|  | 120 | 265 | 1.20 | 8.3 | 486 ± .9 | 1100 ± 3 |
| 1-C | 80 | 96 | 1.20 | 12.6 | 466 ± .5 | 800 ±.6 |
|  | 160 | 197 | 1.23 | 9.5 | 475 ± .5 | 1050 ± 4 |
|  | 220 | 270 | 1.23 | 8.7 | 483 ± .6 | 1200 ± 6 |
| 1-D | 80 | 122 | 1.53 | 14.9 | 455 ± .4 | 875 ± 3 |
|  | 160 | 226 | 1.41 | 10.7 | 460 ± .6 | 1150 ± 4 |
|  | 220 | 296 | 1.35 | 9.3 | 464 ±0 .9 | 1300 ± 5 |
| HIGH IMPACT POLYSTYRENE Monsanto HT-92 | | | | | | |
| Barrel Temperature 400° F. (Except Rear Zone at 300° F.) | | | | | | |
| 1-A | 208 | 376 | 1.81 | 7.9 | 510 ± 6 | 1500 ± 4 |
| 1-B | 216 | 424 | 1.96 | 8.8 | 504 ± .9 | 1600 ± 8 |
| 1-C | 80 | 179 | 2.24 | 10.1 | 455 ± .3 | 1530 ± 6 |
|  | 160 | 328 | 2.05 | 8.9 | 486 ± .6 | 1650 ± 8 |
|  | 230 | 437 | 1.90 | 8.3 | 504 ± .8 | 1730 ± 10 |

TABLE A-continued

|     |     |     |      |      |            |            |
| --- | --- | --- | ---- | ---- | ---------- | ---------- |
|     | 80  | 193 | 2.41 | 10.8 | 450 ± .3   | 1550 ± 6   |
| 1-D | 160 | 347 | 2.17 | 9.5  | 468 ± .6   | 1750 ± 8   |
|     | 224 | 467 | 2.08 | 9.0  | 476.5 ± 8  | 1825 ± 8   |

Another preferred screw design involves a two stage screw having a 4.5 in. diameter, 30:1 L/D with a twin channel metering section constructed in accordance with the flat bottom or constant depth design described above in connection with FIGS. 5, 6. The twin channel metering section of each stage was dimensioned in length at 6 L/D. In the first stage, the clearance between the barrel and the wave crests was about 0.080 in. and the maximum channel depths between wave crests were about 0.350 in.

In the second stage the wave crest clearances were 0.10 in. and the maximum channel depths between wave crests were about 0.450 in. The wave crests were repeated every 360 degrees in each channel on a 6 in. pitch screw flight. The barrier flight was undercut 0.08 in. in the first stage and 0.10 in. in the second stage. The barrier width was 0.18 in. The width of the primary flight was 0.44 in.

With larger diameter screws, e.g., those having diameters of three and one-half inch or greater, it has been found that shear considerations make it desirable to limit the length of the wave portions during which the plastic material within a wave channel is subject to high shear forces. These are the portions near the wave crests. For reference purposes it is useful to consider the "high shear region" of each wave as the channel area where the clearance between the bottom wall of the channel and the barrel is no greater than one and one-half times the minimum clearance (the clearance at the wave crests).

The width of this area is determined by the width of the channel, but the length of this area is a function of wave shape and frequency. Since channel depths are established by machining operations utilizing templates extending parallel to the screw axis, it is convenient to think of length quantities in terms of length measurements made parallel to the screw axis (herein "axial length").

For screws 3½ in. or larger in diameter it is desirable that the "axial lengths" of the "high shear regions" be not greater than twenty percent of the screw diameter. Thus, for a 4½ in. diameter screw, the "high shear regions" should not have "axial lengths" greater than 0.9 in. (0.20×4.5 in.) and the axial lengths may be considerably less in many cases.

The larger diameter screws may also embody wave channels having crests with clearances which are very small in relation to the screw diameter. Whereas the conventional view of scale-up criteria for extruder screws provides for increases that follow the differences in the square roots of the diameters, it has been found that the larger double wave screws need not follow this pattern. Note in this connection that the wave crest clearances of 0.08 and 0.1 inches given for the 4½ in. diameter screw described above are less than 0.05 times the square root of the screw diameter.

Further, empirical studies have shown that the preferred wave crest clearance for a double channel wave in the final metering section of a 4½ in. diameter screw should not exceed about 0.15 inches. For an 8 in. diameter screw the preferred wave crest clearance in a final metering section should not exceed about 0.2 inches. These small clearances contribute to obtaining the highly localized periodic working actions which are a goal of the invention, and it has been found that they can be provided without substantial detriment to the high throughputs characteristic of the larger diameter screws.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In plasticating apparatus of the type in which a rotating screw is disposed within and cooperates with the inner wall of a barrel provided with inlet and outlet openings and wherein particles of synthetic resinous material are introduced through said inlet opening and into a helical passage formed by conveying flight means of said screw, plasticated by said rotating screw and advanced toward said outlet opening, the improvement comprising a screw having a section for assuring complete melting and mixing of said resinous material, said screw section including outwardly extending barrier flight means disposed intermediate said conveying flight means to divide said passage into channels extending side by side helically along said screw section, each of said channels having a depth which varies cyclically through at least four cycles along the helical length of such channel, the minimum depth portions of the channels on opposite sides of said barrier flight means defining wave crests which are displaced helically from each other, and the barrier flight means adjacent each wave crest being undercut to provide sufficient clearance between its outermost surface and the inner barrel wall to permit the flow thereover of molten resinous material from the channel containing an area of decreasing depth to an adjacent area of the other channel, the outer width of said barrier flight means being shorter than that of said conveying flight means, and being less than eight percent of the screw pitch, so that the shear energy imparted to molten material flowing over said barrier flight means is low.

2. A screw according to claim 1 wherein the outer width of said barrier flight means lies within a range from about one percent to about four percent of the screw diameter.

3. The subject matter of claim 2 wherein the clearance between the outermost surface of said barrier flight means and the inner wall of said barrel is in the range of from about forty to about eighty thousandths of an inch.

4. A screw according to claim 1 wherein the clearance between the inner wall of the barrel and at least a substantial number of said wave crests is in the range of from about 0.05 to about 0.10 times the square root of the diameter of the inner wall of the barrel.

5. The subject matter of claim 4 wherein the maximum depth of a channel is in the range of from about 2.5 to about 5 times the minimum depth of a channel.

6. A screw according to claim 1 wherein some of the upstream wave crests of each channel provide greater clearance than some of the downstream wave crests of the same channel to accommodate passage of larger concentrations of unmelted material.

7. The subject matter of claim 1, wherein each of said channel cycles includes an area of increasing channel depth, an area of decreasing channel depth, and an area of constant channel depth, and wherein each wave crest in one of the channels is disposed adjacent an area of constant depth in the other channel.

8. The subject matter of claim 1, wherein the outer edge of said conveying flight means extends into such close proximity to the inner barrel wall as to substantially restrict the passage of quantities of solid resinous material therebetween, and wherein said barrier flight means and conveying flight means are substantially parallel and have a pitch such that the axial advance of each flight means in each 360 degrees about the screw axis is in the range of from about 1.25 to about 1.50 times the diameter described by the outer surface of the conveying flight means.

9. In plasticating apparatus of the type in which a rotating screw, including helical conveying flight means, is disposed within and cooperates with the inner wall of a barrel provided with inlet and outlet openings and wherein particles of synthetic resinous material are introduced through said inlet opening, plasticated by said rotating screw and advanced toward said outlet opening, the improvement comprising a screw having a section for assuring complete melting and mixing of said resinous material, said screw section being provided with a pair of channels extending side by side helically along said screw section with an outwardly protruding barrier flight being located between said channels, each of said channels having a base surface whose radius from the screw axis of rotation varies cyclically through at least four cycles along the helical length of such channel to provide a channel of varying depth, with the variations of said cycles being arranged so that the combined cross-sectional area of said channel is not constant entirely throughout a cycle, the maximum base surface radius portions of the channels on opposite sides of said barrier flight adjacent each area of increasing radius being undercut to provide sufficient clearance between its outermost surface and the inner barrel wall to permit the flow thereover of molten resinous material from the channel containing area of increasing radius to an axially adjacent area of the other channel to the pair.

10. A screw according to claim 9 wherein said channel cycles each include an area of increasing base surface radius, an area of decreasing base surface radius, and an area of constant base surface radius, wherein each maximum base surface radius portion in one channel is disposed adjacent an area of constant base surface radius in the other channel.

11. A screw according to claim 9 wherein each cycle of each channel is asymmetrical in that the extent of an area of decreasing radius is less than the extent of an area of increasing radius of the cycle.

12. A screw according to claim 11 wherein the base surface radius of each channel is continuously varying in the helical direction throughout the length of a cycle.

13. In plasticating apparatus of the type in which a rotating screw is disposed within and cooperates with the inner wall of a barrel provided with inlet and outlet openings and wherein particles of synthetic resinous material are introduced through said inlet opening and into a helical passage formed by conveying flight means of said screw, plasticated by said rotating screw and advanced toward said outlet opening, the improvement comprising a screw having a section for assuring complete melting and mixing of said resinous material, said screw section including outwardly extending barrier flight means disposed intermediate said conveying flight means to divide said passage into channels extending side-by-side helically along said screw section, each of said channels having a depth which varies cyclically through at least four cycles along the helical length of such channel, the minimum depth portions of the channels on opposite sides of said barrier flight means defining wave crests which are displaced helically from each other, a substantial portion of each channel situated between successive wave crests in the channel being of substantially constant depth, the barrier flight means adjacent each wave crest being undercut to provide sufficient clearance between its outermost surface and the inner barrel wall to permit the flow thereover of molten resinous material from the channel containing an area of decreasing depth to an adjacent area of the other channel, the outer width of said barrier flight means being shorter than that of said conveying flight means so that the shear energy imparted to molten material flowing over said barrier flight means is low.

14. In an extruder of the type comprising a barrel provided with a cylindrical bore communicating with a lateral inlet opening for receiving particulate synthetic resinous material and communicating with axial outlet means through which molten synthetic resinous material is forced, an improved screw rotatable within said bore for plasticating the synthetic resinous material and delivering high quality molten material through said outlet means at steady but high throughput rates without overheating the material, said screw comprising a metering section near the discharge end of the screw for receiving the resinous material after a substantial amount of melting has occurred but while some incompletely melted material may be present in the material stream, said metering section being provided with a helical conveying land protruding into such close proximity to the wall of said bore to substantially preclude the flow of quantities of molten resinous material thereover and having a pitch such that the axial advance of a conveying flight along the screw in each 360 degrees about the screw axis is greater than the diameter of said bore, said section also being provided with a helical barrier land running parallel to said conveying land in the space between axially adjacent portions of said conveying land to divide into first and second channels the resinous material passage defined by axially adjacent portions of said conveying land and by channel bottom surfaces disposed closer to the screw axis than the outermost edges of said conveying land, said passage including portions of varying cross-sectional area along the length thereof, the width of the outermost edge of said barrier land being less than that of the outermost edge of said conveying flight and being less than eight percent of the conveying screw pitch, said barrier flight being undercut to provide sufficient clearance between said bore and said barrier flight outermost edge to permit flow of molten resinous material over said barrier flight outermost edge with low shear energy input to the material, said channel bottom surface in said first channel having a radius which increases and decreases cyclically over at least four cycles to give multiple crests and valleys in said first channel, said channel bottom surface in said second channel having a radius which increases and decreases cyclically over at least four cycles which are out of phase with those in said first channel to give multiple crests and valleys in said second channel, said crests having clearances with respect to said barrel bore in the range of from about 0.05 to about 0.10 times the square root of the diameter of the barrel bore and said valleys having clearances with respect to said barrel bore in the range of from about 2.5 to about 5 times the clearance between the barrel bore and the adjacent crests.

15. A method of extruding synthetic resinous material at high but steady throughput rates, without overheating and with good melt quality, comprising processing resinous material in a first zone to melt most of the material and advance it to a metering zone, dividing the flow through said metering zone into two parallel channels each of which has restricted cross-sectional areas at a plurality of locations along its length with the restricted areas in one channel being longitudinally offset from the restricted areas in the other channel and with the cross-sectional area of each channel varying cyclically over at least four substantially identical cycles, forcing incompletely melted resinous material in each of said channels to pass through said restricted areas in that channel to receive extra energy input for melting the same thoroughly, and displacing a portion of the completely molten resinous material from one channel to the other with minimum energy input just in advance of each of said restricted areas to avoid the extra energy input associated with passage through said restricted areas and thereby to avoid overheating of the melted material, said cycles reinforcing one another and collectively providing a steady material flow rate and pressure at the output end of said metering zone.

16. A method according to claim 15 which includes facilitating the flow of molten resinous material from one channel to the other while simultaneously restricting the flow of unmelted resinous material to promote the separation of molten from unmelted material so as to concentrate the passage of unmelted material through the restricted areas and thereby maximize heating of the unmelted material and minimize heating of the molten material.

17. A method according to claim 15 wherein the resinous material travels along a channel portion of substantially constant depth between said restricted areas.

18. In plasticating apparatus of the type in which a rotating screw is disposed within and cooperates with the inner wall of a barrel provided with inlet and outlet openings and wherein particles of synthetic resinous material are introduced through said inlet opening and into a helical passage formed by conveying flight means of said screw, plasticated by said rotating screw and advanced toward said outlet opening, the improvement comprising a screw having a section for assuring complete melting and mixing of said resinous material, said screw section having a diameter of at least about three and one-half inches and including outwardly extending barrier flight means disposed intermediate said conveying flight means to divide said passage into channels extending side by side helically along said screw section, each of said channels having a depth which varies so that in each channel there are at least four spaced apart high shear regions with lower shear regions therebetween, each high shear region including a wave crest and portions on opposite sides of said wave crest having clearances with respect to the inner barrel wall not greater than 1.5 times the wave crest clearance, the wave crest clearances being small enough so that the resinous material passing thereover is worked but said high shear regions being not longer than twenty percent of the screw diameter to so limit the total quantity of energy imparted to the material that overheating is prevented, the wave crests being displaced helically from each other, and the barrier flight means adjacent each wave crest being undercut to provide sufficient clearance between its outermost surface and the inner barrel wall to permit the flow thereover of molten resinous material from the channel containing an area of decreasing depth to an adjacent area of the other channel, the outer width of said barrier flight means being shorter than that of said conveying flight means, and being less than eight percent of the screw pitch, so that the shear energy imparted to molten material flowing over said barrier flight means is low.

19. The subject matter of claim 18 wherein said screw section is about 4½ inches in diameter and wherein said wave crests have clearances with respect to the inner barrel wall of at least about 0.8 inches but not greater than 0.15 inches.

20. The subject matter of claim 18 wherein said screw section is about 8 inches in diameter and wherein said wave crests have clearances with respect to the inner barrel wall not greater than about 0.2 inches.

* * * * *

UNITED STATES PATENT AND TRADEMARK OFFICE
CERTIFICATE OF CORRECTION

PATENT NO. : 4,173,417
DATED : November 6, 1979
INVENTOR(S) : GEORGE A. KRUDER

It is certified that error appears in the above-identified patent and that said Letters Patent are hereby corrected as shown below:

Column 2, line 23, change "and" to --an--.
Column 5, line 46, change "is" to --in--.
Column 7, line 22, change "the" to --this--.
Column 7, line 39, change "diminshed" to --diminished--.
Column 10, line 8 (in Table A), change "43.4 ± 2" to --434.5 ± .2--.
Column 10, line 9 (in Table A), change "447 ± 6" to --447 ± .6--
Column 10, line 11 (in Table A), change "220 ± 4" to --2200 ± 4--
Column 10, line 25 (in Table A), change "1100 ± 3" to --1000 ± 3--
Column 10, line 26, change "120" to --220--.
Column 11, last line of Table A, change "476.5 ± 3" to --476.5 ± .3--

Claim 19, Column 16, line 43, change "0.0" to --0.05--.

Signed and Sealed this

Eleventh Day of November 1980

[SEAL]

Attest:

SIDNEY A. DIAMOND

Attesting Officer

Commissioner of Patents and Trademarks